(No Model.)

S. C. KRAUSE.
MILLINER'S STEAMER.

No. 465,864. Patented Dec. 29, 1891.

WITNESSES

INVENTOR

UNITED STATES PATENT OFFICE.

SARAH COLEMAN KRAUSE, OF BETHLEHEM, PENNSYLVANIA.

MILLINER'S STEAMER.

SPECIFICATION forming part of Letters Patent No. 465,864, dated December 29, 1891.

Application filed June 11, 1891. Serial No. 395,913. (No model.)

*To all whom it may concern:*

Be it known that I, SARAH COLEMAN KRAUSE, of Bethlehem, in the county of Northampton and State of Pennsylvania, have invented certain new and useful Improvements in Milliners' Steamers; and I do hereby declare the following to be a full, clear, and exact description of the invention, such as will enable others skilled in the to art which it pertains to make and use it, reference being had to the accompanying drawings, which form part of this specification.

My invention relates to an improvement in milliners' steamers; and it consists in certain novel features of construction and in the combination and arrangement of parts, which will be fully described hereinafter, and more particularly referred to in the claim hereto annexed.

The object of my invention is to construct an inexpensive device by means of which milliners and others may be able to steam or liven up hats, plushes, feathers, &c.

Figure 1:
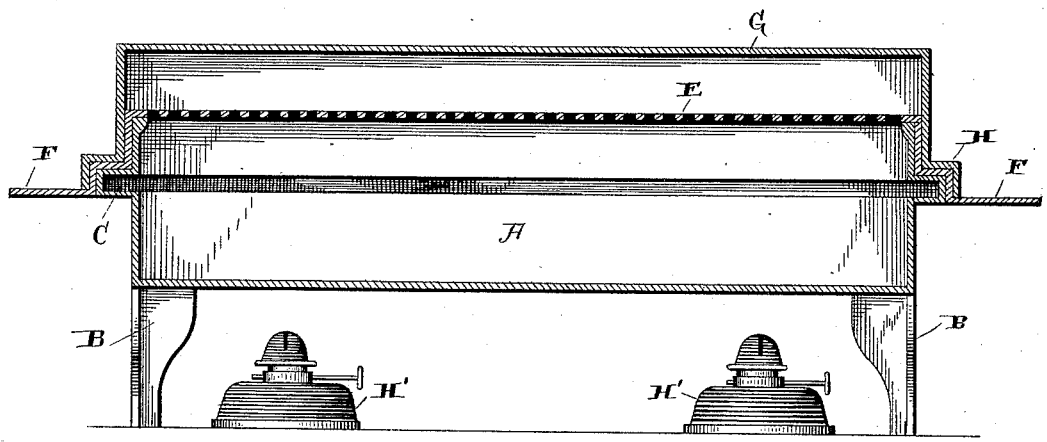
Figure 2:
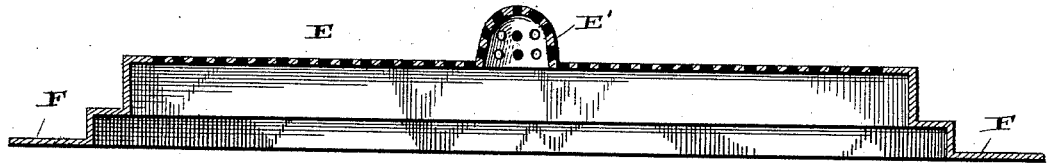

In the accompanying drawings, Figure 1 is a sectional view of my improved steamer. Fig. 2 is a detached view of the perforated support.

The steamer consists of a pan A, constructed of tin or any other metal that may be preferred and which is provided with suitable legs B. Extending entirely around the pan near its top is the bulge C, which serves as a support for the cover G. Adapted to be placed over the pan A is the sheet-metal perforated cover E, preferably formed of copper, and which has its edge turned down to fit over the sides of the pan, whereby it is held in position on the same. This perforated cover is provided with one or more upwardly-projecting bulges E', which fit the crowns of the hats being steamed, thus applying the steam directly to the surface it is desired to renovate.

The articles being placed in position on the perforated cover, the water in the pan A is heated by means of the lamps H', and steam is generated, which rises through the perforations in the cover.

While the device as here shown is especially adapted for steaming hats, yet it will be understood that plushes, feathers, laces, and the like, can be placed on the perforated cover and steamed with equal effect.

When the steamer is not in use, it is provided with a tightly-fitting cover G, which is formed with a step H around its lower edge for fitting over the bulge C of the steaming-pan. By this means a very tight joint is formed and thereby all dust is excluded. When first heating the water, it has been found desirable to retain the cover in place, thereby retaining the heat and hastening the generation of the steam.

Two alcohol-lamps H' are provided for heating the water, and while any form of lamp may be used that may be desired I prefer those burning alcohol, as no smut or soot is incident to its combustion, and hence there is no danger of the articles in the steamer being soiled from this cause.

The device as herein shown and described is very cheap and simple, and will be found of great convenience to milliners and others who work with goods which require renovating.

Having thus described my invention, I claim—

In a steamer, a receptacle adapted to hold water, means for heating the water, a perforated plate adapted to fit the top of the receptacle, and a bulge formed on the said plate, for the purpose substantially as shown and described.

In testimony whereof I affix my signature in presence of two witnesses.

SARAH COLEMAN KRAUSE.

Witnesses:
JACOB W. LUCKENBACH,
EDWD. J. KRAUSE.